March 23, 1971 — P. A. STAHR — 3,572,160

MOTION TRANSMITTING REMOTE CONTROL ASSEMBLY

Filed June 12, 1969

INVENTOR.
Peter A. Stahr
BY Bernard, McGlynn & Reising
ATTORNEYS

United States Patent Office 3,572,160
Patented Mar. 23, 1971

3,572,160
MOTION TRANSMITTING REMOTE
CONTROL ASSEMBLY
Peter Anten Stahr, Pontiac, Mich., assignor to Teleflex
Incorporated, North Wales, Pa.
Filed June 12, 1969, Ser. No. 832,709
Int. Cl. F16c 1/10
U.S. Cl. 74—501                               14 Claims

ABSTRACT OF THE DISCLOSURE

A motion transmitting remote control assembly including a conduit movably supporting a motion transmitting core element. A fitting is disposed about the conduit adjacent one end for attaching the conduit to a support structure. A plate-like bracket having teeth therealong is disposed adjacent the opposite end of the conduit and is adapted to be connected to a support structure. An adjustment means comprising an elongated member of organic polymeric material molded about the conduit includes a first plurality of teeth with arms extending from opposite extremities thereof for coacting with a groove in the plate to maintain the teeth in the adjustment means in spaced relationship to the teeth along the periphery of the plate whereby the adjustment means may be moved along the plate. The arms also coact with a slot in the plate so that the adjustment means may be snapped into position with the teeth thereof engaging the teeth of the plate to prevent movement of the adjustment means along the plate.

---

The instant invention relates to a motion transmitting remote control assembly of the type wherein motion is transmitted in a curved path by flexible motion transmitting core element movably supported by a flexible conduit.

Motion transmitting remote control assemblies of the type to which the instant invention pertains are utilized in aircraft, automotive, and marine vehicles. Normally, these assemblies include a flexible conduit with the flexible motion transmitting core element extending from each end of the conduit and means adjacent the ends of the conduit for attaching the conduit to a support structure. It frequently occurs that when such assemblies are installed the core element doesn't extend from one end or the other of the conduit the correct distance and it is, therefore, desirable to adjust the length of the conduit to change the position of the end of the core element. By way of example, such remote control assemblies are utilized to interconnect the accelerator pedal and a carburetor operating lever in automobiles. In installing such a remote control assembly, the conduit is attached to the body of the automobile adjacent the accelerator pedal and the core element is attached to the accelerator pedal. The opposit end of the conduit is attached to a support adjacent the carburetor and the opposite end of the core element is attached to the operating lever of the carburetor. It frequently occurs, however, that the core element does not extend from the conduit the proper amount for attachment to the operating lever of the carburetor. In other words, the accelerator pedal may be in its unmoved or idle position yet the operating lever of the carburetor must be moved from its idle position in order to be connected to the core element. If the core element extends from the conduit too far, its position may be adjusted by lengthening the path over which it must travel between the accelerator pedal and the operating lever of the carburetor. This may be accomplished by lengthening the conduit between the positions at which it is attached to the support structure. Alternative assemblies for accomplishing the adjustment of the length of the conduit to vary the distance the core element extends therefrom are shown in U.S. Pats. 3,289,491 and 3,393,578, both of which are assigned to the assignee of the instant invention. The assemblies shown in these two patents, however, employ rotating threaded members which must be manually rotated to change the length of the conduit. This, of course, is excellent for small adjustments which require little time but is not entirely satisfactory for situations where the adjustments may vary significantly and must be made rapidly.

Accordingly, it is an object and feature of this invention to provide a motion transmitting remote control assembly including a conduit movably supporting a core element with means for allowing the longitudinal position of the conduit to be rapidly changed and snapped into a locked position to prevent further longitudinal movement.

In correlation with the foregoing object and feature, it is another object and feature of this invention to provide such a remote control assembly including an adjustment means immovably attached to the conduit adjacent one end thereof and a support means adapted to be connected to a support structure with the support means and the adjustment means including coacting means for allowing relative movement therebetween in a direction longitudinally of the conduit when in a first position and for preventing such relative movement when in a second position.

In correlation with the foregoing object and feature, it is another object and feature of this invention to provide such a remote control assembly wherein the coacting means includes first and second pluralities of teeth with one plurality of teeth being associated with the support means and the other being associated with the adjustment means.

Other objects and attendant advantages of the present invention will be readily appreciated as the same becomes better understood by reference to the following detailed description when considered in connection with the accompanying drawings wherein.

Referring now to the drawings wherein like numerals indicate like or corresponding parts throughout the several views, a motion transmitting remote control assembly constructed in accordance with the instant invention is generally shown at 10.

Figure 1:
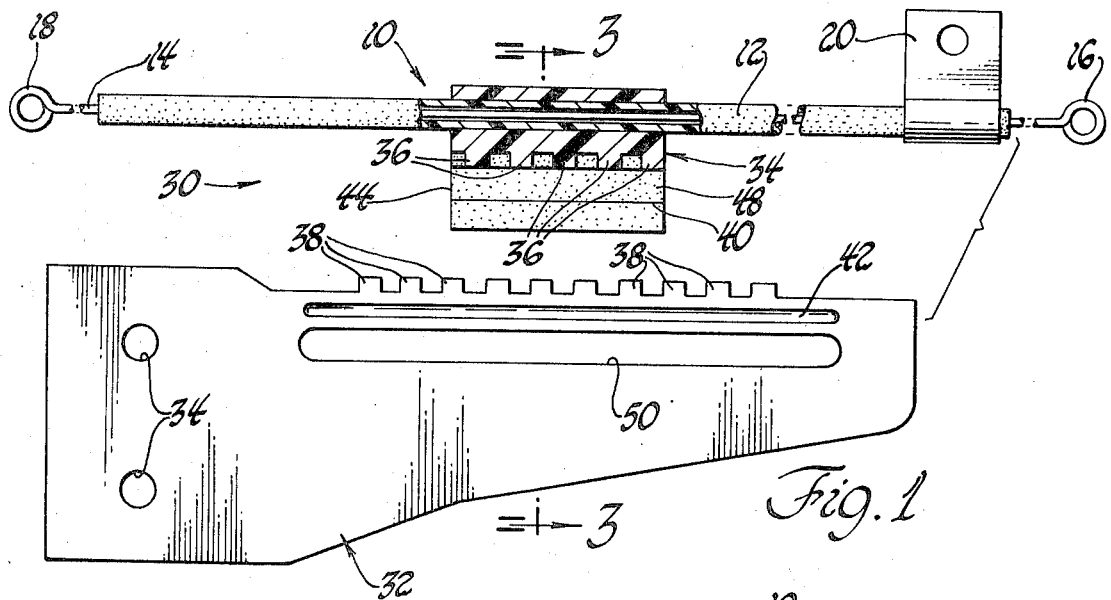
FIG. 1 is an elevational view partially broken away of a preferred embodiment of the instant invention shown partially disassembled.

The assembly includes a flexible conduit 12 which is preferably of the type including an inner tubular member of organic polymeric material surrounded by a plurality of long lay wires helically disposed about the inner tubular member and a casing of organic polymeric material disposed about the wires and the inner tubular member. There is also included a motion transmitting core element 14 moveably supported by the conduit 12 with the ends thereof extending from the ends of the conduit. The core element 14 is a wire like member including one or more loops 16 at a first end and one or more loops 18 at a second end. A fitting 20 preferably made of organic polymeric material is disposed about and attached to the conduit 12 adjacent one end of the conduit for attaching the conduit to a support structure. The fitting 12 includes a flange having a hole therein through which a fastener may be disposed to attach the fitting to a support structure.

The assembly also includes means generally shown at 30 adapted to support the conduit 12 to allow the longitudinal position thereof to be adjusted and for snapping into a locked position to maintain the longitudinal position of the conduit. More specifically, the means 30 includes a support means comprising the plate-like bracket 32 adapted by the holes 34 to be connected to a support structure and adjustment means generally indicated at 34 comprising an elongated member of organic polymeric material and molded about the conduit 12 adjacent the second end of the conduit 12 so as to be immovably attached to the conduit. The support means 32 and the adjustment means 34 include coacting means for allowing relative movement therebetween in a direction longitudinally of the conduit 12 when in a first position, as illustrated in FIG. 4, and for preventing the relative movement when in a second position, as illustrated in FIG. 5.

The coacting means includes a first plurality of teeth 36 associated with or formed in the adjustment means 34 and a second plurality of teeth 38 which are associated with or formed along one extremity of the support means 32. The first plurality of teeth 36 are movable with the adjustment means 34 and the conduit 12 in a direction transversely of the longitudinal axis of the conduit 12 between the first position illustrated in FIG. 4, where they are out of engagement with the second plurality of teeth 38, and the second position, where they are in engagement with the second plurality of teeth, as illustrated in FIG. 5.

Figures 3, 4, 5:
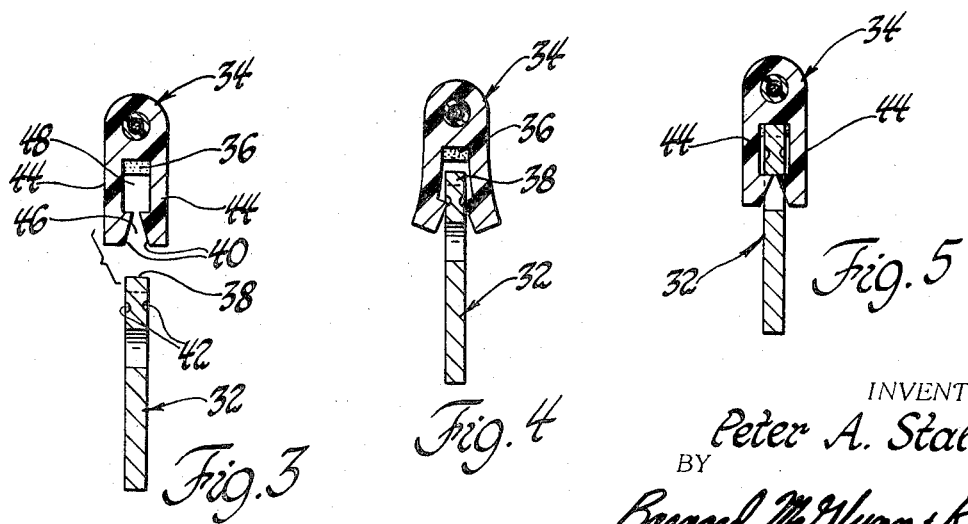
FIG. 3 is a cross sectional view taken substantially along line 3—3 of FIG. 1.
FIG. 4 is cross sectional view similar to FIG. 3 but showing the assembly in a first position wherein the conduit may be moved longitudinally to an adjusted position.
FIG. 5 is a cross sectional view taken substantially along line 5—5 of FIG. 2.

The coacting means also includes positioning means for maintaining the first plurality of teeth 36 in the first position, illustrated in FIG. 4, and for limiting relative movement in a direction longitudinally of the conduit between the support means 32 and the adjustment means 34. The positioning means comprises tongue means 40 and groove means 42 for allowing the adjustment means 34 to slide along the plate-like bracket comprising the support means 32 a limited amount while maintaining the first plurality of teeth 36 in spaced relation to the second plurality of teeth 38, as illustrated in FIG. 4. The adjustment means 34 includes a pair of spaced arms 44 extending from opposite extremities of the first plurality of teeth 36. The tongue means 40 comprises a pair of opposed lips disposed adjacent the distal ends of the arms 44. The opposed lips are tapered in a direction toward the distal ends of the arms 44 to define a V-shape which opens into the space or bore 48 between the arms 44. The groove means 42 comprises a groove extending along each face of the bracket defining the support means 32 and in spaced relationship to the second plurality of teeth 38.

Initially, the adjustment means 34 is separate from the support means 32 but is moved into the first position as the V-shape 46 engages the extremity of the bracket of the support means 32 along which the teeth 38 are disposed so as to force the arms 44 apart as the adjustment means 34 moves onto the bracket and the lips defining the tongue means 40 are disposed in the grooves defining the groove means 42. This is the first position as illustrated in FIG. 4. The tongue and groove means 40 and 42 limit longitudinal movement of the adjustment means 34 along the bracket of the support means 32 as the lips defining the tongue means 40 engage the ends of the grooves defining the groove means 42.

The bracket of the support means 32 also includes a retaining means comprising the elongated slot 50 for coacting with the adjustment means 34 to retain the first plurality of teeth 36 in the second position in engagement with the second plurality of teeth 38, as illustrated in FIG. 5. The elongated slot 50 extends through the bracket of the support means 32 and is in spaced relationship to the groove means 42. The slot 50 is substantially co-extensive with the grooves and receives the opposed lips of the tongue means 40 while the portion of the bracket of the support means 32 between the extremity defining the second plurality of teeth 38 and the slot 50 is disposed in the space 48 between the arms 44, as illustrated in FIG. 5. The lips of the tongue means 40, therefore, engage the periphery of the elongated slot 50 to prevent the adjustment means 34 from being removed from the bracket defining the support means 32 while maintaining the first plurality of teeth 36 in meshing engagement with the second plurality of teeth 38 to prevent longitudinal movement of the conduit 12 relative to the bracket defining support means 32. It will be appreciated that instead of square teeth as illustrated, the first and second plurality of teeth 36 and 38 may be of different configurations, such as being triangular in cross section.

Figure 2:
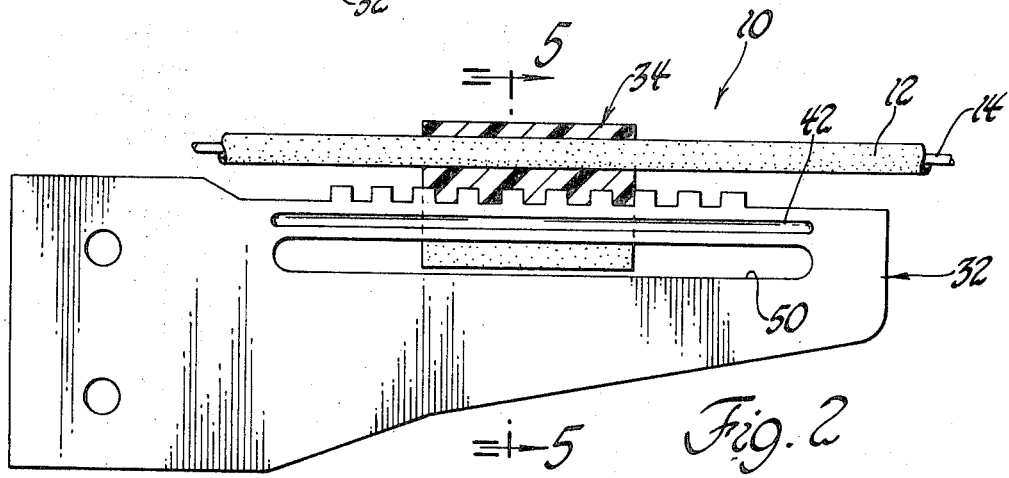
FIG. 2 is a fragmentary view partially in cross section showing the assembly completely assembled wherein longitudinal movement of the conduit is prevented.

Normally, the assembly is installed with the fitting 20 attached to a support structure and the loop 16 of the core element attached to a control member with the bracket of the support means 32 attached to the support structure and the adjustment means 34 disposed in the first position as illustrated in FIG. 4. If the core element 14 extends from the conduit 12 too far so that the position of the loop 18 is too far to the left as illustrated in FIG. 1, the adjustment means 34 is moved along the bracket of the support means 32 to the right until the loop 18 is in the proper position. As the adjustment means 34 is moved to the right, the conduit 12 is bowed or curved to a greater extent thereby to increase the length of its path to move the loop 18 of the core element 14 to the right. The adjustment means 34 may be moved in the opposite direction relative to the bracket of the support means 32 to move the loops 18 of the core element 18 to the left as illustrated in FIG. 1. Once the core element is in the proper position, the adjustment means 34 is moved in a direction transversely to the longitudinal axis of the conduit 12 to the second position as illustrated in FIGS. 2 and 5.

Another feature of this invention is that the positioning means also provides a predetermined resistance to the relative movement between the support means and the adjustment means when they are in the first position illustrated in FIG. 4. In this position, the arms 44 are moved apart so as to be disposed in clamping relationship with the support means 32 so that the lip portions thereof bear against the support means to provide the predetermined resistance to longitudinal movement along the support means 32. Consequently, there is no slop in the assembly when the adjustment means is positioned as illustrated in FIG. 4 and the adjustment means may be moved longitudinally to a very precise position where it will remain until moved transversely to the locking position shown in FIG. 5.

The embodiments of the invention in which an exclusive property or privilege is claimed are defined as follows:

1. A motion transmitting remote control assembly comprising; a conduit, a core element movably supported by said conduit with the ends thereof extending from the ends of said conduit, a fitting adjacent a first end of said conduit for attaching said conduit to a support structure, support means adapted to be connected to a support structure, adjustment means immovably attached to said conduit adjacent the second end thereof, said support means and said adjustment means including coacting means for allowing relative movement therebetween in a direction longitudinally of said conduit when in a first position and for preventing said relative movement when in a second position, said coacting means including coacting teeth which are disposed in mechanical interlocking engagement in said second position.

2. An assembly as set forth in claim 1 wherein said coacting means includes a first plurality of teeth and a second plurality of teeth one of said plurality of teeth being associated with said support means and the other being associated with said adjustment means.

3. An assembly as set forth in claim 2 wherein said first plurality of teeth are movable in a direction transversely of the longitudinal axis of said conduit between said first position out of engagement with said second plurality of teeth and said second position in engagemet with said second plurality of teeth.

4. An assembly as set forth in claim 3 wherein said coacting means includes positioning means adjacent said first plurality of teeth for maintaining the latter in said first position.

5. An assembly as set forth in claim 4 wherein said support means comprises a bracket with said second plurality of teeth formed therein along one extremity thereof.

6. An assembly as set forth in claim 5 wherein said positioning means comprises tongue means and groove means for allowing said adjustment means to slide along said bracket a limited amount while maintaining said first plurality of teeth in said first position.

7. An assembly as set forth in claim 6 wherein said adjustment means includes a pair of spaced arms extending from opposite extremities of said first plurality of teeth, said tongue means comprising a pair of opposed lips disposed adjacent the distal ends of said arms, said bracket comprising a plate-like member and said groove means comprising a groove extending along each face of said bracket in spaced relationship to said second plurality of teeth therealong.

8. An assembly as set forth in claim 7 wherein said bracket includes retaining means for coacting with said adjustment means to retain said first plurality of teeth in said second position.

9. An assembly as set forth in claim 8 wherein said retaining means comprises an elongated slot extending along said bracket in spaced relationship to said grooves and substantially coextensive therewith for receiving said opposed lips as the portion of said bracket between said second plurality of teeth and said slot is disposed in the space between said arms.

10. An assembly as set forth in claim 9 wherein said opposed lips are tapered in a direction toward the distal ends of said arms to define a V-shape which opens into the space between said arms whereby said adjustment means may be moved onto said bracket by forcing said arms apart.

11. An assembly as set forth in claim 3 wherein said coacting means includes positioning means for maintaining said first plurality of teeth in said first position and for limiting said relative movement between said support means and said adjustment means.

12. An assembly as set forth in claim 11 wherein said adjustment means is made of organic polymeric material and is disposed about said conduit, said first plurality of teeth being formed in and disposed along said adjustment means.

13. A motion transmitting remote control assembly comprising; a conduit, a core element movably supported by said conduit with the ends thereof extending from the ends of said conduit, a fitting adjacent a first end of said conduit for attaching said conduit to a support structure, support means adapted to be connected to a support structure, adjustment means immovably attached to said conduit adjacent the seond end thereof, said support means and said adjustment means including coacting means for allowing relative movement therebetween in a direction longitudinally of said conduit when in a first position and for preventing said relative movemet when in a second position, said coacting means including positioning means for providing a predetermined resistance to said relative movement between said support means and said adjustment means when in said first position.

14. An assembly as set forth in claim 13 wherein said positioning means include a pair of spaced arms having at least portions thereof disposed in clamping relationship with said support means in said first position to provide said predetermined resistance.

References Cited

UNITED STATES PATENTS

| | | | |
|---|---|---|---|
| 1,081,934 | 12/1913 | Wessoleck | 64—4X |
| 2,872,793 | 2/1959 | Botti | 64—4 |

MILTON KAUFMAN, Primary Examiner